(12) United States Patent
Czachor, Jr. et al.

(10) Patent No.: US 9,094,514 B2
(45) Date of Patent: *Jul. 28, 2015

(54) AURAL VOLUME FEEDBACK IN CALL CENTER

(71) Applicant: ASD Inc., Media, PA (US)

(72) Inventors: Martin Czachor, Jr., Newtown Square, PA (US); Kevin Czachor, West Chester, PA (US); Norman Franke, Garnet Valley, PA (US); Gary Foster, Media, PA (US)

(73) Assignee: ASD INC., Media, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,716

(22) Filed: Nov. 19, 2014

(65) Prior Publication Data

US 2015/0163359 A1 Jun. 11, 2015

Related U.S. Application Data

(63) Continuation of application No. 14/099,138, filed on Dec. 6, 2013, now Pat. No. 8,929,535.

(51) Int. Cl.
*H04M 3/00* (2006.01)
*H04M 5/00* (2006.01)
*H04M 3/51* (2006.01)

(52) U.S. Cl.
CPC ...... *H04M 3/5175* (2013.01); *H04M 2203/402* (2013.01)

(58) Field of Classification Search
USPC ........................................ 379/265.07, 265.06
See application file for complete search history.

(56) References Cited

U.S. PATENT DOCUMENTS 5,712,954 A 1/1998 Dezonno
2012/0069986 A1 3/2012 Edholm

*Primary Examiner* — Quynh Nguyen
(74) *Attorney, Agent, or Firm* — Law Offices of Steven H. Meyer, LLC

(57) ABSTRACT

An aural volume feedback system is implemented in a center having a plurality of agents working thereat. Each agent is situated at a work station for being in calling contact with a client. At the work station, a microphone transforms aural speech of the agent into an electrical format, and a volume detector samples the electrical format and generates based on the sampling an instantaneous volume level. The volume detector compares the generated volume level to a predetermined threshold to determine that the agent is speaking excessively loudly, and thereafter outputs a trigger signal. A feedback generator receives the trigger signal, and based thereon generates a feedback to be perceived by the offending agent at the work station, where the perceived feedback hopefully causes the offending agent to reduce the aural volume thereof.

16 Claims, 4 Drawing Sheets

AURAL VOLUME FEEDBACK IN CALL CENTER

CROSS-REFERENCE TO RELATED APPLICATION

The present application is a continuation of U.S. patent application Ser. No. 14/099,138, filed on Dec. 6, 2013, and entitled "Aural Volume Feedback in Call Center or the Like" (as filed), hereby incorporated by reference in its entirety.

FIELD

The present disclosure relates to a call center or the like as operated by a business organization or the like, where the call center includes a plurality of agents or the like who may be in relatively close proximity to one another, each agent engaging in oral conversation with a client remotely located with respect thereto via a communicative link established therebetween. More particularly, the present disclosure relates to such a call center or the like where each agent is provided with feedback regarding an aural volume thereof during the conversation, whereby the agent can lower the aural volume thereof as may be needed to avoid disturbing other agents adjacent thereto.

BACKGROUND

As may be known, a call center or the like may be established by or on behalf of a business organization in order that the business organization may effectuate contact with clients thereof in order to service the clients in the course of operating the business organization. The call center may be established primarily to receive incoming calls from the clients regarding the business organization and the goods and/or services offered thereby, and/or to generate outgoing calls to the clients regarding same. Typically, the incoming and/or outgoing calls are telephone calls, although other types of calls may also be employed.

In the call center, a plurality of call-handling agents may be arranged to handle the calls, where each call agent may be trained by or on behalf of the call center to handle calls in a prescribed manner or may be expected to handle each call on an ad hoc basis. Typically, although by no means necessarily, each agent is situated at a work station with call communication equipment and a computing device. As should be understood, the call communication equipment may be a headset or handset or the like whereby the agent can communicate at least aurally with a client by way of the call communication equipment, and the computing device may be a computer or terminal or the like that allows the agent access to data and other information relevant to the client, and that also may provide the agent with a script or the like that the agent may refer to in the course of communicating with the client. The computing device may include software or the like specifically tailored to the operation of the call center and the activities of the agent at the computing device, and it may in fact be the case that that the computing device and software may control the call communication equipment as employed by the agent at such computing device.

Inasmuch as the call center may have a relatively large number of agents and physical space in the call center may be at a premium, it can be the case that there are a large number of agents in the call center at work stations in close proximity to each other in a single room, perhaps with little if any in the way of physical separation between the work stations. Arrangements of such agents and work stations in such physical space at a call center are many and varied, but it is not unusual to have agents arranged to sit only 3 or 4 feet away from adjacent agents.

As should be appreciated, the general emotional stresses experienced by each agent while working in the call center can be relatively high to start out, and can be heightened merely because the agent is so close to other agents. Moreover, such stresses can be intensified if background noise from the other agents is deemed excessive, which is more likely to happen as the agent is closer to other agents. Background noise can thus be considered to be a significant issue in the call center.

That said, a distinction is to be made between overall background noise, which may be characterized as the indistinct hum generated from multiple speaking agents conversing with clients, and the background noise from an excessively loud agent, which may be characterized as the utterly distinct sound from that agent conversing loudly with the client thereof. In particular, it has been empirically observed that while overall background noise is bothersome, such overall background noise can usually be 'tuned out' by an agent and thereby ignored or at least managed by the agent. In contrast, it has also been empirically observed that the utterly distinct sound from an excessively loud agent is not only bothersome but also cannot be as easily tuned out by an agent, and thus can become an unmanageable distraction for the agent.

Accordingly, a need exists for a system and method for reducing background noise as perceived by agents in a call center. Specifically, a need exists for such a system and method where an excessively loud agent in the call center is detected and mitigated. In particular, a need exists for such a system and method where a detected excessively loud agent is notified of same so that the excessively loud agent can quiet oneself and be less bothersome to adjacent agents in the call center. Accordingly, the adjacent agents can proceed with their conversations with less distraction.

SUMMARY

The aforementioned needs are satisfied by an aural volume feedback system implemented in a center having a plurality of agents working thereat. Each agent is situated at a work station for being in calling contact with a client by way of the work station to service the client, and the system detects when the agent is excessively loud and provides feedback to the excessively loud agent.

In the system, a microphone of the work station transforms aural speech of the agent into an electrical format, and a volume detector of the work station samples the electrical format of the speech of the agent and generates based on the sampling an instantaneous volume level associated with the speech of the agent. The volume detector compares the generated instantaneous volume level to a predetermined threshold to determine that the agent is speaking with an excessively loud volume, and thereafter outputs a trigger signal to indicate that the agent is an offending agent who is talking with an excessively loud volume. A feedback generator of the work station receives the trigger signal from the volume detector, and based thereon generates a feedback to be perceived by the offending agent at the work station, where the perceived feedback hopefully causes the offending agent to reduce the aural volume thereof.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
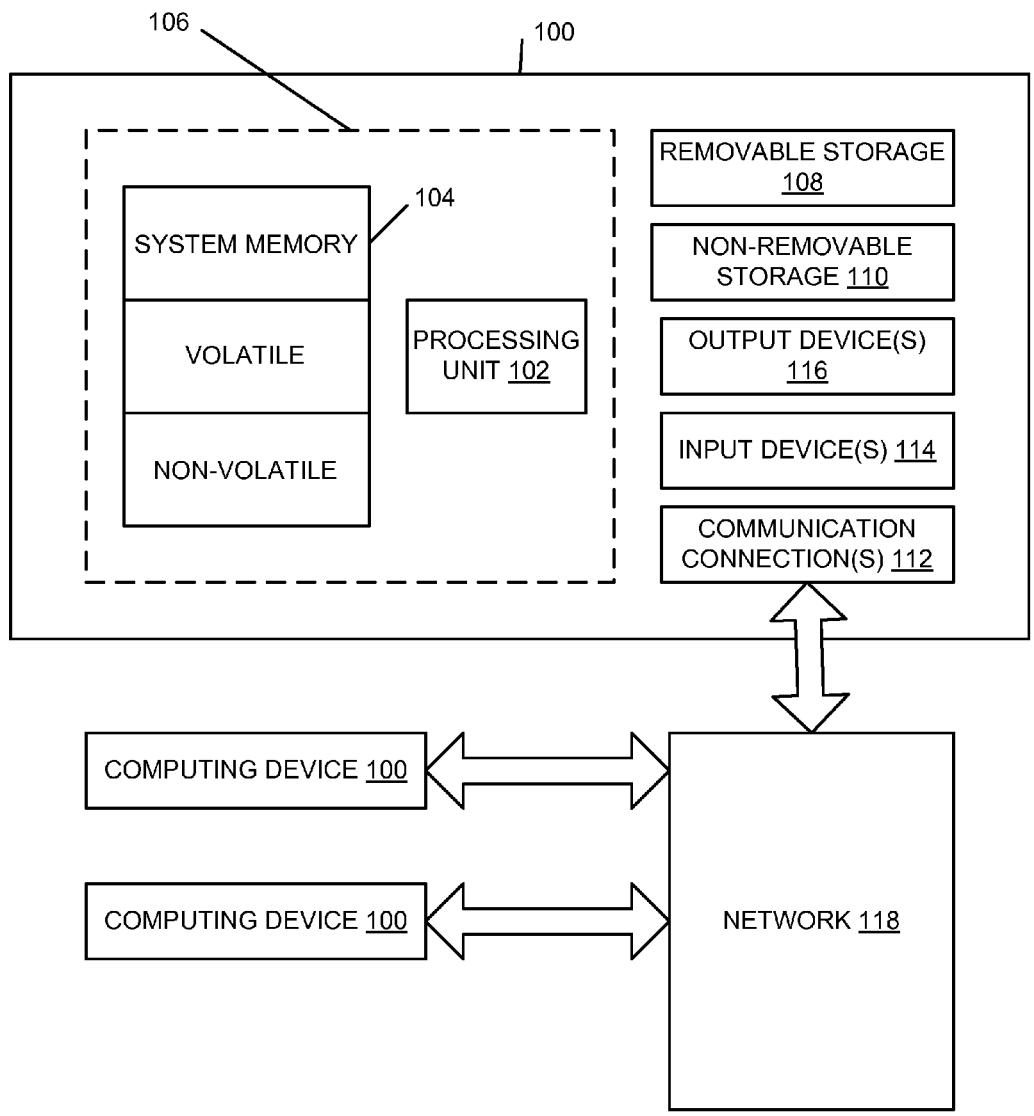
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the plural of that term is also contemplated unless circumstances clearly dictate otherwise. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by the relevant public. Although any methods and materials similar or equivalent to those described herein can be used in the practice or testing of the present innovation, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices including smart phones and computing tablets, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), infrared, WiFi, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be the Internet, a public switched telephone network for landline telephone communications, a mobile switching center for wireless telephone communications, a paging network for distributing paging information, a private multimedia network for establishing videoconferencing, or the like. Thus, it should be appreciated that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, so-called thumb drives and/or flash drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Call Center

Figure 2:
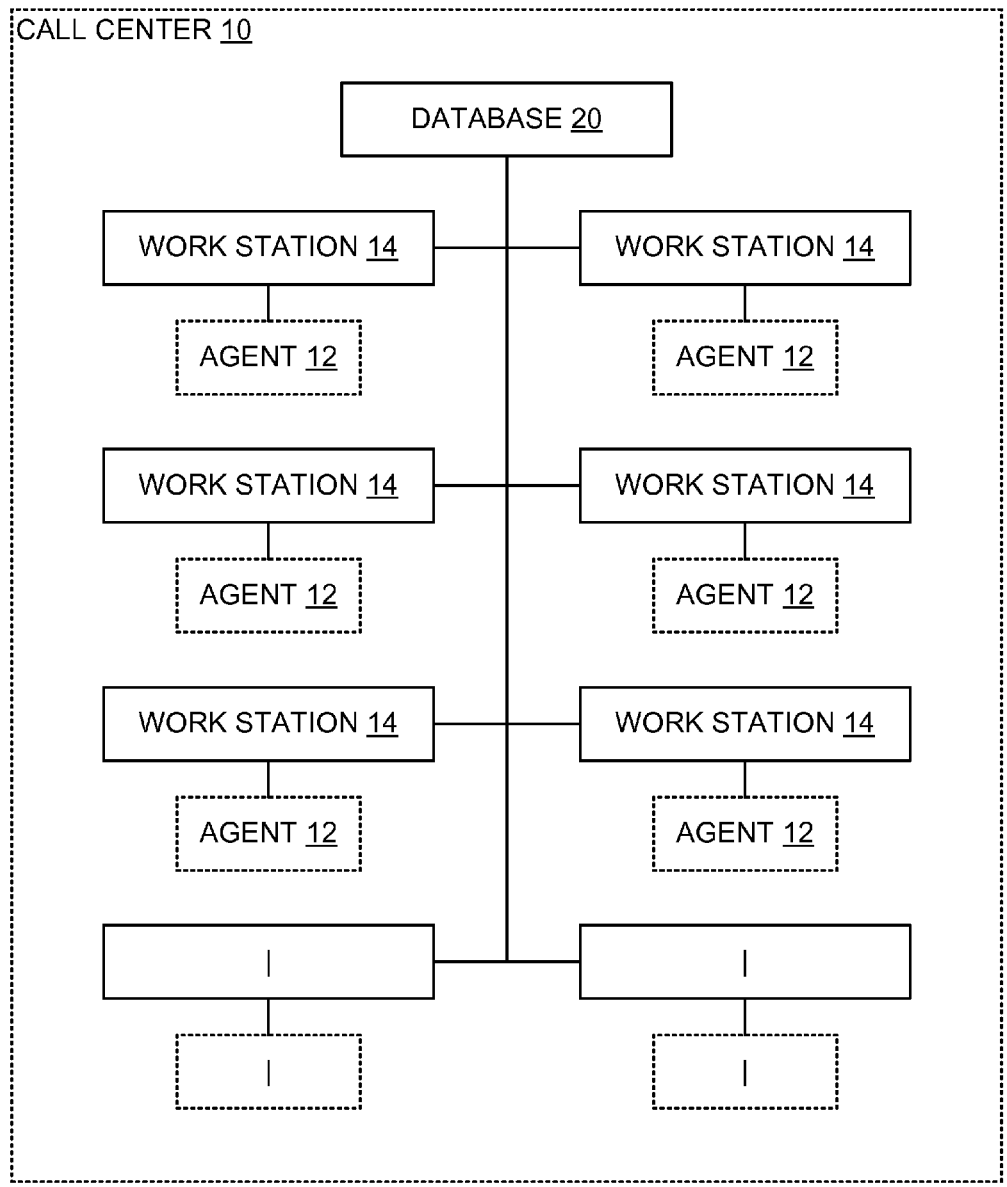
FIG. 2 is a block diagram showing a call center wherein a plurality of agents at work stations converse with clients in various embodiments of the present innovation.

Turning now to FIG. 2, it is seen that a call center 10 is provided by or on behalf of a business organization in order that the business organization may effectuate contact with clients thereof in order to service the clients in the course of operating the business organization. The call center 10 may receive incoming calls from the clients and/or generate outgoing calls to the clients regarding same. Typically, the incoming and/or outgoing calls are telephone calls effectuated via a public switched telephone network, although other types of calls may also be employed without departing from the spirit and scope of the present innovation. For example, the calls alternately may be video or audiovisual calls and/or effectuated via a data and/or packet-based network.

In the call center 10, a plurality of call-handling agents or other individuals 12 are employed to handle the calls, where each call agent 12 is trained by or on behalf of the call center 10 to handle calls in a prescribed manner or may be expected to handle each call on an ad hoc basis, which is to say that the present innovation contemplates agents 12 employed specifically to handle calls and also agents 12 that answer calls in the course of their employment among other things. Typically, although by no means necessarily, each agent 12 is situated at a work station 14.

Figure 3:
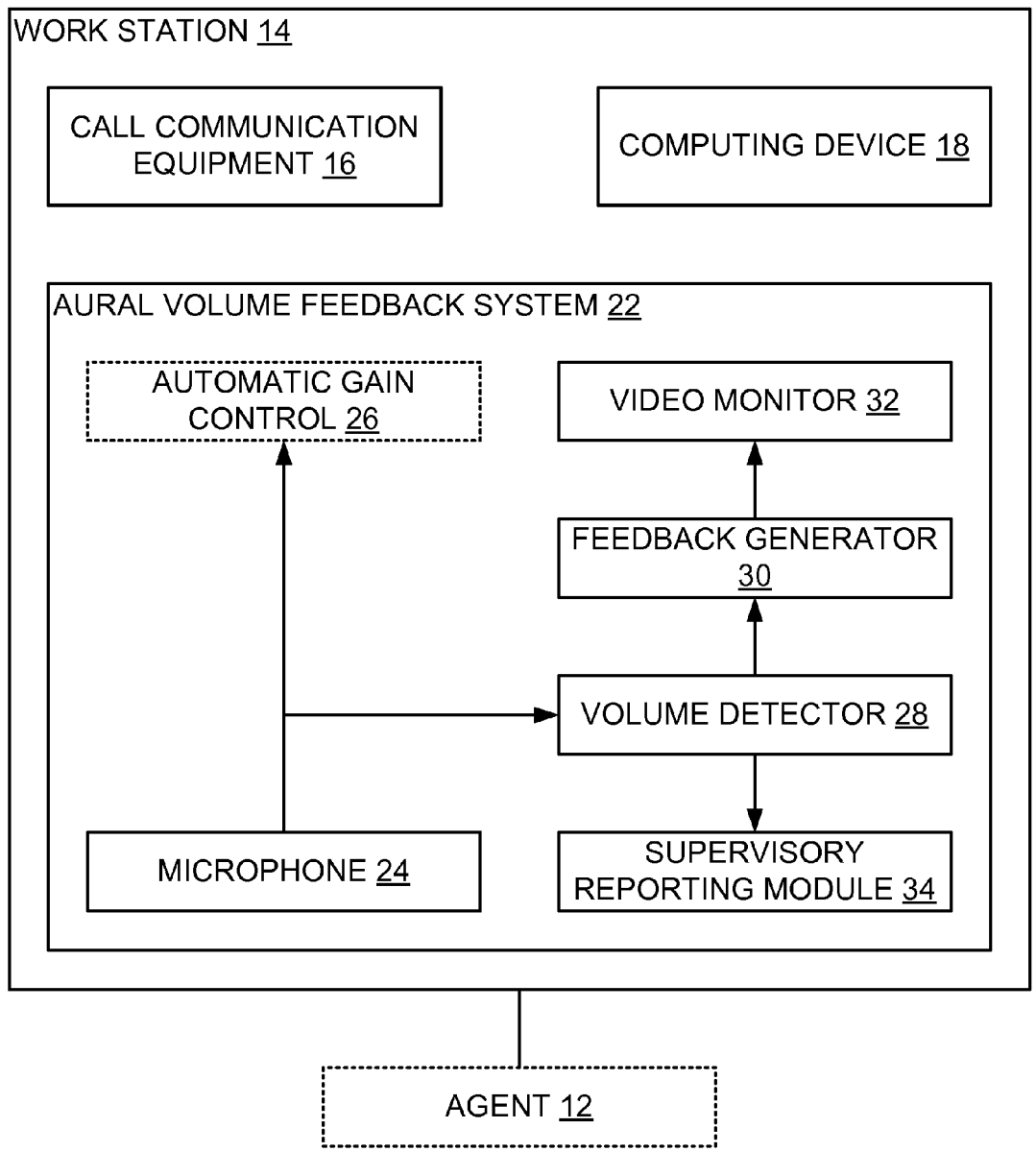
FIG. 3 is a block diagram showing a work station of FIG. 2 as employed by an agent of the call center, where the work station includes an aural volume feedback system in various embodiments of the present innovation.

Turning now to FIG. 3, it is seen that each work station 14 may be provided with call communication equipment 16 and a computing device 18. The call communication equipment 16 may include a headset or handset or the like whereby the agent 12 can communicate at least aurally (i.e., by voice) with a client by way of the call communication equipment 16. Thus, the call communication equipment 16 for example may be a typical telephone, or may be a headset with a transmitting microphone and a receiving earpiece. In the case of a headset, the headset may be communicatively coupled with a separate telephone or the like or may be communicatively coupled directly to the computing device 18, in which case the computing device 18 includes at least a portion of the call communication equipment 14 (shown in FIG. 3) and appropriate communications couplings and functionality for effectuating necessary communications between the agent 12 and the client.

Note that at least a portion of the call communication equipment 16 may be embodied by way of appropriate hardware of the computing device 18 and at least a portion of the call communication equipment 16 may be embodied by way of appropriate software running on the hardware of the computing device 18. Such call communication equipment 16 is known or should be apparent to the relevant public and therefore need not be set forth herein in any detail other than that which is set forth. Accordingly, such call communication equipment 16 may be any appropriate equipment without departing from the spirit and scope of the present innovation as long as the equipment 16 provides the functionality necessary for the innovation.

The computing device 18 may be a computer or terminal or the like that allows the agent 12 to access and store data and other information relevant to the client. Typically, such data is accessed from and/or stored to a centralized database 20 or the like (FIG. 2) in which case each computing device 18 is appropriately communicatively coupled to such database 20 by way of an appropriate network or the like. Such database 20 and network may be any appropriate database and network without departing from the spirit and scope of the present innovation, although presumptively the network and database 20 are tailored toward the functionality performed by the agents 12 and call center 10.

In at least some circumstances each agent 12 in the call center 10 operates according to a script or the like that the agent 12 may refer to in the course of communicating with the client. The script may be any appropriate script, although presumptively the script is customized to the purpose of the communication between the agent 12 and the client. For example, if the call center 10 answers telephone calls on behalf of funeral directors, the script may effectuate conversations regarding funeral services. Typically, although by no means necessarily, the script not only guides the agent 12 in the conversation but also retrieves relevant data pertaining to the conversation from the database 20 and also stores data collected by the agent 12 in the course of the conversation with the client in the database 20. As should be evident, the script if employed may be most any appropriate script.

The computing device 18 may include software or the like specifically tailored to the operation of the call center 10 and/or the activities of the agent 12 at the computing device, and it may in fact be the case that that the computing device 18 and software may control the call communication equipment 16 as employed by the agent 12 at such computing device 18, run the aforementioned script, and otherwise perform the functionality required for the activities performed by the agent 12 at the call center 10. Such software may include most any appropriate software and provide most any functionality as may be desired. The software may be commercially available call-handling and data-manipulating software, may be customized call-handling and data-manipulating software, or may be a combination thereof.

As was set forth above, the call center 10 may have a relatively large number of agents 12 in a relatively small amount of physical space. While the agents 12 may be arranged in the call center 10 in any particular manner without departing from the spirit and scope of the present innovation, it is to be appreciated that physical space within the call center 10 is often limited. Put simply, agents 12 do not require very much physical space for performing their jobs, and the cost of operating the call center 10 within the physical space is often maximized by reducing the amount of physical space to a bare minimum. Accordingly, it is not unheard of to have agents laterally spaced every three or four feet within rows of work stations 14, or to have the rows orthogonally spaced every five or six feet. Thus, the agents 12 in the call center 10 can be expected to have to work in close proximity to each other. Such close proximity may at times be mitigated by the use of physical dividers separating the work stations 14 in the call center 10, but such physical dividers may be dispensed with if considered a luxury or otherwise uneconomical or unnecessary.

Aural Volume Feedback

The agents 12 are human beings, which among other things means that such agents 12 are susceptible to emotions, stresses, minimum comfort levels, and other human reactions and limitations. As was set forth above, the agents 12 are in particular sensitive to emotions and stresses brought about by working in the relative confines of the call center 10. Notably, the relatively small personal space afforded to each agent 12 in the call center 10 in combination with the general background noise of multiple agents 12 in a relatively small space conversing with clients can be quite taxing to the psyches of the agents 12.

Such general background noise among the agents 12 if excessive can become a significant issue in the call center 10. However, and as was alluded to above, a distinction may be made between general background noise that is overall background noise, which may be characterized as the indistinct hum generated from multiple speaking agents 12 conversing with clients, and general background noise that is the background noise from an excessively loud agent 12, which may be characterized as the utterly distinct sound from that agent 12 talking or conversing loudly with the client thereof. In particular, and again, empirical observation shows that while overall background noise is bothersome, such overall background noise can usually be 'tuned out' by an agent and thereby ignored or at least managed by the agent 12. In contrast, empirical observation also shows that the utterly distinct sound from an excessively loud agent 12 is not only bothersome to nearby agents 12 but also cannot be as easily tuned out by the nearby agents 12, and thus can become an unmanageable distraction for the nearby agents 12. As a result, an excessively loud agent 12 is typically more stressful to nearby agents 12 than the overall background noise in a call center 10. Moreover, an excessively loud agent 12 can cause nearby agents 12 to have to talk louder to clients, which can iterate and spread through the call center 10 until many of the agents 12 are talking excessively loudly.

Accordingly, in various embodiments of the present innovation, systems and methods are provided to detect when an agent 12 is an excessively loud agent, and to provide feedback to the excessively loud agent 12 regarding his or her excessive aural/talking volume/loudness. Accordingly, the offending excessively loud agent 12 aware of being characterized as such is given an opportunity to reduce his or her aural volume. Presuming the aural volume of the offending agent 12 is indeed reduced, nearby agents 12 are no longer unmanageably distracted thereby. Moreover, the loudness is contained and prevented from spreading within the call center 10.

Still referring to FIG. 3, it is seen that in various embodiments of the present innovation, each work station 14 in a call center 10 is provided with an aural volume feedback system 22 to perform the aforementioned detection and feedback functions for the corresponding agent 12, inasmuch as the work station 14 of the agent 12 includes most if not all of the hardware required for the feedback system 22 for the agent 12. The feedback system 22 at each work station 14 may be implemented thereat by way of hardware of the computing device 18, hardware of the call communication equipment 16, hardware distinct from the computing device 18 and call communication equipment 16, software on the computing device 18 or elsewhere, or a combination thereof. The feedback system 22 may alternately be implemented at most any other appropriate location if deemed necessary and/or advisable.

Figure 4:
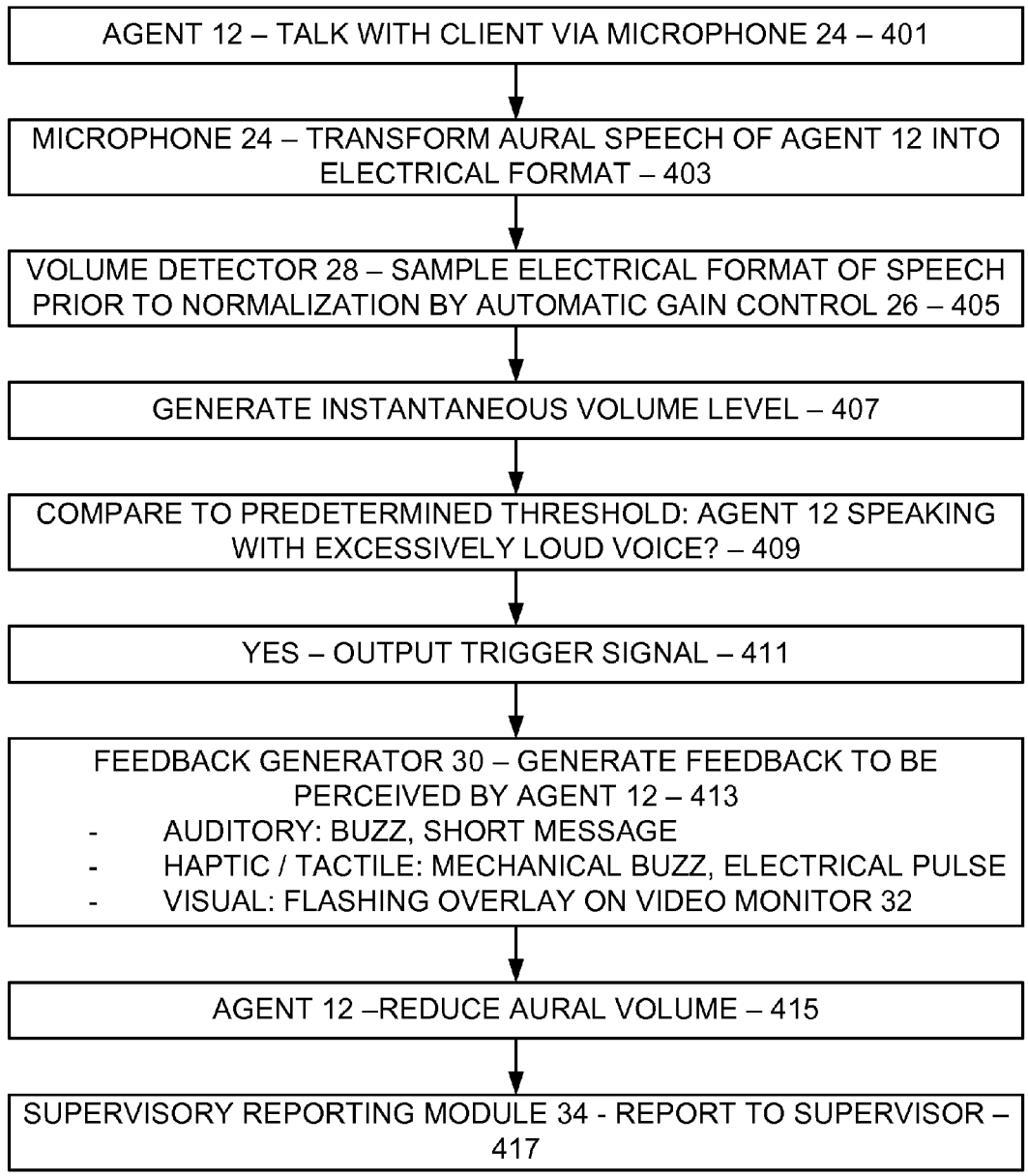
FIG. 4 is a flow diagram showing actions performed by the aural volume feedback system of FIG. 3 in accordance with various embodiments of the present innovation.

In pertinent part, and referring now to FIG. 4, an agent 12 at a work station 14 at the call center 10 and on a call with a client talks with same by way of aurally speaking into a microphone 24 or the like associated with the call communications equipment 16 of the work station 14 (401), and the microphone 24 transforms the aural speech of the agent 12 into an electrical format in a manner that is generally known and therefore need not be set forth herein in any detail (403). Typically, the call communications equipment 16 also includes an automatic gain control 26 which normalizes the electrical format of the speech of the agent 12 such that the speech of the agent 12 as perceived by the client is neither too loud nor too soft. That is, if the aural speech of the agent 12 is perceived by the automatic gain control 26 to be too loud, the electrical format of the speech of the agent 12 is reduced in volume, and correspondingly if the aural speech of the agent 12 is perceived by the automatic gain control 26 to be too soft, the electrical format of the speech of the agent 12 is increased in volume. Such an automatic gain control 26 is generally known or should be apparent to the relevant public and therefore need not be set forth herein in any detail. As may be appreciated, the automatic gain control 26 may be implemented as hardware and/or software in the call communications equipment 16 of the work station 14.

In various embodiments of the present innovation, prior to the automatic gain control 26 normalizing the electrical format of the speech of the agent 12, the 'raw' non-normalized electrical format of the speech of the agent 12 is sampled by a volume detector 28 of the aural volume feedback system 22 (405). In particular, the volume detector 28 samples the raw format of the speech over some temporal window or the like, generates based on the sampling an instantaneous volume level associated with the raw format of the speech (407), and compares the generated instantaneous volume level to a predetermined threshold to determine if the agent 12 is speaking with an excessively loud volume (409). As may be appreciated, the volume detector 28 may be implemented as hardware and/or software in the call communications equipment 16 of the work station 14, and/or may be implemented in combination with the automatic gain control 26.

The predetermined threshold employed by the volume detector 28 may be any appropriate threshold without departing from the spirit and scope of the present innovation. For example, if it is considered that an instantaneous volume level in the range of −30 to −20 dB is normal, then the threshold of the volume detector 28 may be set at −10 dB so that an instantaneous volume level above −10 dB is determined to be excessively loud. If indeed the instantaneous volume level exceeds the predetermined threshold, the volume detector 28 outputs a trigger signal to indicate that the agent 12 is an offending agent who is talking with an excessively loud volume (411).

In various embodiments of the present innovation, the trigger signal from the volume detector 28 indicating that offending agent 12 is talking with an excessively loud volume is received by a feedback generator 30 of the aural volume feedback system 22. Based on receiving the trigger signal, the feedback generator 30 then generates a feedback to be perceived by the offending agent 12 at the work station 14 (413), where the perceived feedback hopefully causes the offending agent 12 to reduce his or her aural volume (415). As may be appreciated, the feedback generator 30 may be implemented as hardware and/or software in the work station 14 as necessary and/or appropriate. As may also be appreciated, the feedback generated by the feedback generator 30 may be most any appropriate feedback as may be deemed advisable.

It may be that the feedback is of an auditory nature, perhaps in the way of a buzz or short message heard by the offending agent 12 over an earphone or the like associated with the call communications equipment 16 of the work station 14. However, auditory feedback may be particularly jarring to the offending agent 12 in a way that could distract such offending agent 12 from hearing the client during the call, or that could cause the offending agent 12 to lose attention to the client during the call, and therefore may be inadvisable. Similarly, it may be that the feedback is of a haptic or tactile nature, perhaps in the way of a mechanical buzz or electrical pulse felt by the offending agent 12 over a haptic receiver or the like associated with the call communications equipment 16 of the work station 14. However, haptic feedback may also be particularly jarring to the offending agent 12 in a way that could distract such offending agent 12 from the client during the call, or else could be ignored or misinterpreted if not well-applied, and therefore may also be inadvisable.

In various embodiments of the present innovation, then, the feedback is of a visual nature, perhaps in the way of a message appearing to the offending agent from a video monitor 32 associated with the computing device 18 of the work station 14. Note here that the visual feedback may be made to be clear and unambiguous, and yet is not usually particularly jarring to the offending agent 12 inasmuch as such offending agent 12 is likely conditioned to expect sudden changes on the video monitor, and therefore is more advisable. Thus, such visual feedback may be any appropriate visual feedback without departing from the spirit and scope of the present innovation, presuming that such visual feedback is generally accepted to be both unambiguous and yet not jarring to the offending agent 12.

Empirically, it has been determined that a visual feedback comprising a flashing overlay on the video monitor 32 for about five seconds seems to work well. For example, the flashing overlay may be an unambiguous short message in a large typeface, perhaps on the order of 'TOO LOUD', or 'PLEASE TALK MORE SOFTLY' or even just '[QUIETER]'. It is expected that the flashing overlay may also be an appropriate picture or even a short video presentation, perhaps of a comical nature but nevertheless clearly showing that the offending agent 12 needs to reduce his or her aural volume.

Presumptively, the feedback from the feedback generator 30 continues until the offending agent 12 does indeed reduce his or her aural volume, or at least for a predetermined period of time. Notably, if the offending agent 12 does not reduce his or her aural volume, the feedback may continue in a level manner or in an escalating manner. As may be appreciated, the feedback continued in a level manner generally is perceived as having a steady urgency. For example, a flashing overlay may repeatedly appear for five seconds and disappear for five seconds. Correspondingly, the feedback continued in an escalating manner generally is perceived as having increasing urgency. For example, a flashing overlay may repeatedly appear, but in a larger typeface as time progresses without the offending agent reducing his or her aural volume, perhaps to convey exasperation or the need to pay attention.

It is expected that the aural volume feedback system 22 of the present innovation will reduce many instances of offending agents 12 being chronically excessively loud when conversing with clients. Empirically, it has been shown that instances of excessive loudness are reduced by approximately 70 percent in a time frame of as little as three weeks, although experiences are expected to vary based on differing circumstances. Moreover, it has been shown empirically that recidivism is minimal, which is to say that most formerly offending agents 12 seem to remain non-offending without slipping back into bad habits. Perhaps more importantly, in a call center 10 where the aural volume feedback system 22 is in use at each work station 14, the work environment is less stressful and agents 12 are more focused on their prescribed tasks.

Nevertheless, it is expected that from time to time an offending agent 12 may ignore the feedback and that a formerly offending agent 12 may indeed slip back into bad habits and become a repeat offender. In such instances it may be helpful to include with each aural volume feedback system 22 a supervisory reporting module 34 that reports to a supervisor. As may be appreciated, the supervisory reporting module 34 receives the trigger signal from the volume detector 28 and at least notes that the volume detector 28 has output the trigger signal.

As may be appreciated, the supervisory reporting module 34 may report to the supervisor (417) when the corresponding agent 12 is troublesome and not responding well to the system 22. As such, the supervisor may among other things consult with the troublesome agent 12 and perhaps explore available options for correcting the troublesome behavior. The supervisory reporting module 34 may in addition report to the supervisor on a regular basis regarding the corresponding agent 12 and relevant statistics compiled therefrom, and may indeed report to the supervisor whenever the volume detector 28 outputs a trigger signal, among other things.

CONCLUSION

The programming believed necessary to effectuate the processes performed by the aural volume feedback system 22 and related components in connection with the various embodiments of the present innovation is relatively straightforward and should be apparent to the relevant programming public. Accordingly, such programming is not attached hereto. Any particular programming, then, may be employed to effectuate the various embodiments of the present innovation without departing from the spirit and scope thereof.

In the present innovation, a system and method are set forth for reducing background noise as perceived by agents 12 or the like in a call center 10 or the like. Thus, an excessively loud agent 12 in the call center 10 is detected and hopefully mitigated. The detected excessively loud agent 12 is notified of same so that the excessively loud agent 12 can quiet oneself and be less bothersome to adjacent agents 12 in the call center 10. Accordingly, the adjacent agents 12 can proceed with their conversations with less distraction.

It should be appreciated that changes could be made to the embodiments described above without departing from the innovative concepts thereof. For example, although the present innovation is set forth primarily in terms of telephonic calls or the like as handled in a call center 10, such innovation may also be practiced with regard to other types of communications and/or in other settings, perhaps with suitable modification. For example, the communications may be radio communications in a radio dispatch center, or in-person communications in an open-office setting. Likewise, although the present innovation may be set forth with reference to circumstances including certain types of occupations, environments, machinery, hardware, and/or software, and the like, differing circumstances may also be employed, perhaps with suitable modification. It should be understood, therefore, that this innovation is not limited to the particular embodiments disclosed, but it is intended to cover modifications within the spirit and scope of the present innovation as defined by the appended claims.

The invention claimed is:

1. A method performed with regard to a center having a plurality of agents working thereat, each agent being situated at a work station for being in calling contact with a client by way of the work station to service the client, the method for detecting when the agent is excessively loud and providing feedback to the excessively loud agent and comprising:

transforming, at a microphone of the work station, aural speech of the agent into an electrical format;

sampling, at a volume detector of the work station, the electrical format of the speech of the agent and generating based on the sampling an instantaneous volume level associated with the speech of the agent;

comparing, at the volume detector of the work station, the generated instantaneous volume level to a predetermined threshold to determine that the agent is speaking with an excessively loud volume;

outputting, at the volume detector of the work station, a trigger signal to indicate that the agent is an offending agent who is talking with an excessively loud volume;

receiving, at a feedback generator of the work station, the trigger signal from the volume detector, and based thereon generating a feedback to be perceived by the offending agent at the work station, the perceived feedback for causing the offending agent to reduce the aural volume thereof, the work station including an automatic gain control for normalizing the electrical format of the speech of the agent, the method comprising sampling, at the volume detector of the work station, the electrical format of the speech of the agent prior to the automatic gain control normalizing the electrical format of the speech of the agent.

2. The method of claim 1 wherein the center is a telephone call center.

3. The method of claim 1 wherein the work station is a computing device.

4. The method of claim 1 wherein the work station is a computing device including call communication equipment for effectuating calling contact between the agent and the client and software instantiated on the computing device to control the call communication equipment and to implement the volume detector and the feedback generator.

5. The method of claim 1 wherein an instantaneous volume level in the range of −30 to −20 dB is considered normal, the method comprising determining that the agent is speaking with an excessively loud volume if the instantaneous volume level exceeds −10 dB.

6. The method of claim 1 wherein the generated feedback is one of an auditory feedback, a haptic feedback, and a visual feedback.

7. The method of claim 1 wherein the generated feedback is a visual feedback comprising a message appearing to the offending agent from a video monitor of the work station of the offending agent, the visual feedback comprising an overlay flashing on the video monitor for a period of time.

8. The method of claim 1 wherein the generated feedback continues in an escalating manner until the offending agent reduces his or her aural volume.

9. An aural volume feedback system implemented in a center having a plurality of agents working thereat, each agent being situated at a work station for being in calling contact with a client by way of the work station to service the client, the system for detecting when the agent is excessively loud and providing feedback to the excessively loud agent and comprising:

a microphone of the work station transforming aural speech of the agent into an electrical format;

a volume detector of the work station sampling the electrical format of the speech of the agent and generating based on the sampling an instantaneous volume level associated with the speech of the agent;

the volume detector of the work station comparing the generated instantaneous volume level to a predetermined threshold to determine that the agent is speaking with an excessively loud volume;

the volume detector of the work station outputting a trigger signal to indicate that the agent is an offending agent who is talking with an excessively loud volume;

a feedback generator of the work station receiving the trigger signal from the volume detector, and based thereon generating a feedback to be perceived by the offending agent at the work station, the perceived feedback for causing the offending agent to reduce the aural volume thereof, and the work station including an automatic gain control for normalizing the electrical format of the speech of the agent, the system comprising the volume detector sampling the electrical format of the speech of the agent prior to the automatic gain control normalizing the electrical format of the speech of the agent.

10. The system of claim 9 wherein the center is a telephone call center.

11. The system of claim 9 wherein the work station is a computing device.

12. The system of claim 9 wherein the work station is a computing device including call communication equipment for effectuating calling contact between the agent and the client and software instantiated on the computing device to control the call communication equipment and to implement the volume detector and the feedback generator.

13. The system of claim 9 wherein an instantaneous volume level in the range of −30 to −20 dB is considered normal, the system comprising the volume detector determining that the agent is speaking with an excessively loud volume if the instantaneous volume level exceeds −10 dB.

14. The system of claim 9 wherein the generated feedback is one of an auditory feedback, a haptic feedback, and a visual feedback.

15. The system of claim 9 wherein the generated feedback is a visual feedback comprising a message appearing to the offending agent from a video monitor of the work station of the offending agent, the visual feedback comprising an overlay flashing on the video monitor for a period of time.

16. The system of claim 9 wherein the generated feedback continues in an escalating manner until the offending agent reduces his or her aural volume.

* * * * *